US010511027B2

(12) United States Patent
Cohen

(10) Patent No.: US 10,511,027 B2
(45) Date of Patent: Dec. 17, 2019

(54) BATTERIES AND RELATED STRUCTURES HAVING FRACTAL OR SELF-COMPLEMENTARY STRUCTURES

(71) Applicant: Fractal Antenna Systems, Inc., Bedford, MA (US)

(72) Inventor: Nathan Cohen, Belmont, MA (US)

(73) Assignee: Fractal Antenna Systems, Inc., Bedford, MA (US)

( * ) Notice: Subject to any disclaimer, the term of this patent is extended or adjusted under 35 U.S.C. 154(b) by 0 days.

(21) Appl. No.: 15/589,434

(22) Filed: May 8, 2017

(65) Prior Publication Data

US 2018/0114989 A1   Apr. 26, 2018

Related U.S. Application Data

(63) Continuation of application No. 14/263,965, filed on Apr. 28, 2014, now Pat. No. 9,647,271.

(60) Provisional application No. 61/969,076, filed on Mar. 21, 2014, provisional application No. 61/854,544, filed on Apr. 26, 2013.

(51) Int. Cl.
| | |
|---|---|
| H01M 4/66 | (2006.01) |
| H01M 4/70 | (2006.01) |
| G21B 3/00 | (2006.01) |
| C22C 19/03 | (2006.01) |
| H01M 4/02 | (2006.01) |

(52) U.S. Cl.
CPC ........... *H01M 4/661* (2013.01); *G21B 3/002* (2013.01); *H01M 4/70* (2013.01); *C22C 19/03* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2006/0063062 A1* | 3/2006 | Zhou | B01D 53/945 502/300 |
| 2006/0088768 A1* | 4/2006 | Fang | H01M 4/13 429/241 |
| 2012/0051639 A1* | 3/2012 | Kruglick | G06T 7/48 382/173 |
| 2012/0269309 A1 | 10/2012 | Iwamura | |
| 2013/0044847 A1 | 2/2013 | Steinberg | |
| 2013/0337322 A1* | 12/2013 | Takijiri | H01M 4/13 429/211 |

FOREIGN PATENT DOCUMENTS

WO     WO2012124687     *  9/2012

* cited by examiner

Primary Examiner — Christopher P Domone
(74) Attorney, Agent, or Firm — Cesari and McKenna, LLP

(57) ABSTRACT

An aspect of the subject technology/invention of the present disclosure includes electrode structures or elements/components that have (e.g., present) fractal and/or self-complementary shapes or structures, e.g., on a surface. Such shapes or structures can be pre-existing. The electrodes can be made of any suitable material. The electrodes may function or operate or be used as a "seed" structure to incorporate or receive a material or materials useful for lattice assisted nuclear reactions and/or cold fusion processes.

4 Claims, 3 Drawing Sheets

BATTERIES AND RELATED STRUCTURES HAVING FRACTAL OR SELF-COMPLEMENTARY STRUCTURES

RELATED APPLICATIONS

This application is a Continuation of U.S. application Ser. No. 14/263,965, filed on 28 Apr. 2014, entitled "Batteries and Related Structures Having Fractal or Self-Complementary Structures," which claims the benefit of U.S. Provisional Application No. 61/969,076, entitled "LANR Electrodes Having Fractal Structures and Related Excitation Techniques," filed 21 Mar. 2014, and which also claims the benefit of U.S. Provisional Application No. 61/854,544, entitled "Battery Using Self Complementary Rough Electronics and Electrolyte," filed 26 Apr. 2013; the entire contents of all of which applications are incorporated herein by reference.

BACKGROUND

Technical Field

The present disclosure relates to batteries and related components, including such that can be used for lattice-assisted nuclear reactions, cold fusion, and chemical-based batteries, and structures and techniques useful for the same.

Description of Related Art

Lattice-assisted nuclear reactions and cold fusion have been studied over the last twenty years. Chemical-based batteries have also been studied.

SUMMARY

The present disclosure is directed to features of batteries or power cells; such can include devices and/or structures (means) for generating electricity based on chemical and/or nuclear reactions.

One aspect of the subject technology/invention of the present disclosure includes electrode structures or elements/components that have (e.g., present) fractal shapes and/or self-complementary structures, e.g., on a surface or for an electrode. Such shapes or structures can be pre-existing. The electrodes can be made of any suitable material. The electrodes may function or operate or be used as a "seed" structure to incorporate or receive a material or materials useful for lattice assisted nuclear reactions and/or cold fusion processes. For example, such electrodes may include metals or other materials suitable for deuterium-loading in such lattice assisted nuclear reactions and/or cold fusion processes. Suitable examples include but are not limited to nickel, including (e.g., as particulate inclusions or coatings) palladium, niobium, lithium containing ceramics, tantalum, vanadium, platinum, iridium, boron-10, and/or nickel-boron alloy.

Fractal shapes as the term is used herein can include those that approximate or approach the shapes of fractals, either determinative or non-determinative; such fractal shapes can include shapes defined at any order or iteration of a fractal generator, e.g., from according to a nth generation or iteration based on a generator shape.

A further aspect of the subject technology/invention of the present disclosure includes the application of RF energy to electrodes (e.g., cathodes) useful or used for LANR or cold fusion processes to enhance such processes by supplying energy. Such cathodes may be ones with pre-existing fractal features, e.g. as shown and described herein; or the cathodes may be ones that have fractal features created during a LANR or cold fusion process (e.g., during annealing) where the cathode did not have fractal features prior to the LANR or cold fusion process.

Another aspect can include features (surfaces and/or three-dimensional shapes) that are self-complementary. Self-complementary shapes as the term is used herein are those that have a closed area (area made with or including one or more materials, e.g., a conductor) that is congruent to an open area such that the open and closed areas can be brought into coincidence through a rigid motion such as offset (translation), reflection, or rotation. The open and closed areas can each be composite areas, i.e., they may have separate portions. These features can be used in and/or for the production of electricity. Exemplary embodiments can include one or more electrodes (e.g., an anode and/or cathode) that include one or more self-complementary features.

Exemplary embodiments can include electrodes and/or battery components that have both fractal-based and self-complementary based features. For example, a battery according to the present disclosure may include an electrode that has fractal-based features and another electrode (and/or substrate) that includes self-complementary based features.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration; and, the drawings are not necessarily drawn to scale. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Embodiments of the subject technology described herein can provide for batteries or battery components, where the term "battery" is used in a broad sense to include a component or device that can be utilized for the production of electrical energy; such may be based on nuclear reaction(s) and/or chemical reaction(s).

An aspect of the subject technology/invention of the present disclosure includes electrode structures or elements/components that have (e.g., present) fractal shapes or structures, e.g., on a surface. Such fractal shapes or structures can be pre-existing. The electrodes can be made of any suitable material. The electrodes may function or operate or be used as a "seed" structure to incorporate or receive a material or materials useful for lattice assisted nuclear reactions and/or cold fusion processes. For example, such electrodes may include metals or other materials suitable for deuterium-loading in such lattice assisted nuclear reactions and/or cold fusion processes. Suitable examples include but are not limited to nickel, including (e.g., as particulate inclusions or coatings) palladium, niobium, lithium containing ceramics, tantalum, vanadium, platinum, iridium, boron-10, and/or nickel-boron alloy. Any suitable electrolyte(s) may be used as one skilled in the art will appreciate. Examples include but are not limited to solid lithium thiophsphate, and/or liquid electrolytes in lithium-ion batteries consist of lithium salts, such as LiPF6, LiBF4, or LiClQ4 in an organic solvent, such as ethylene carbonate, dimethyl carbonate, and diethyl carbonate, or the like; others may of course be used within the scope of the present disclosure.

A further aspect of the subject technology/invention of the present disclosure includes the application of RF energy to electrodes (e.g., cathodes) useful or used for LANR or cold fusion processes to enhance such processes by supplying energy. Such cathodes may be ones with pre-existing fractal features, e.g. as shown and described herein; or the cathodes may be ones that have fractal features created during a LANR or cold fusion process (e.g., during annealing) where the cathode did not have fractal features prior to the LANR or cold fusion process.

Figure 1A:
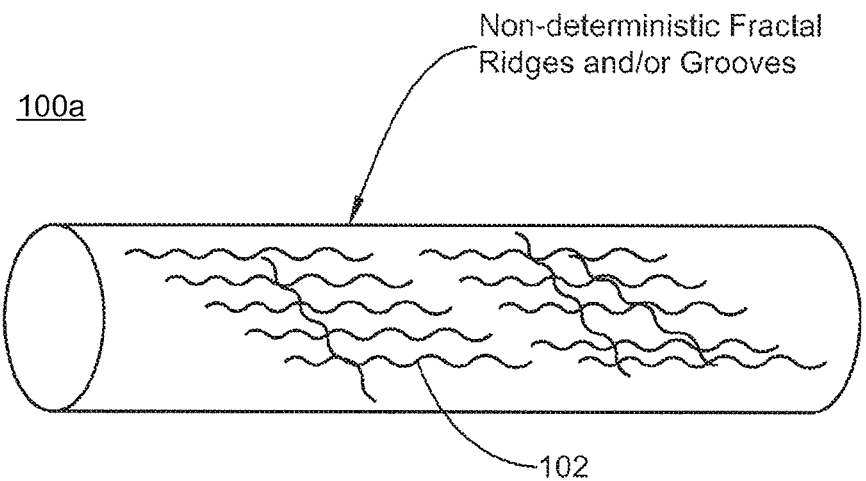
FIGS. 1A-1B illustrate perspective views of examples of electrodes (e.g., cathodes or anodes) in accordance with the present disclosure.
Figure 1B:
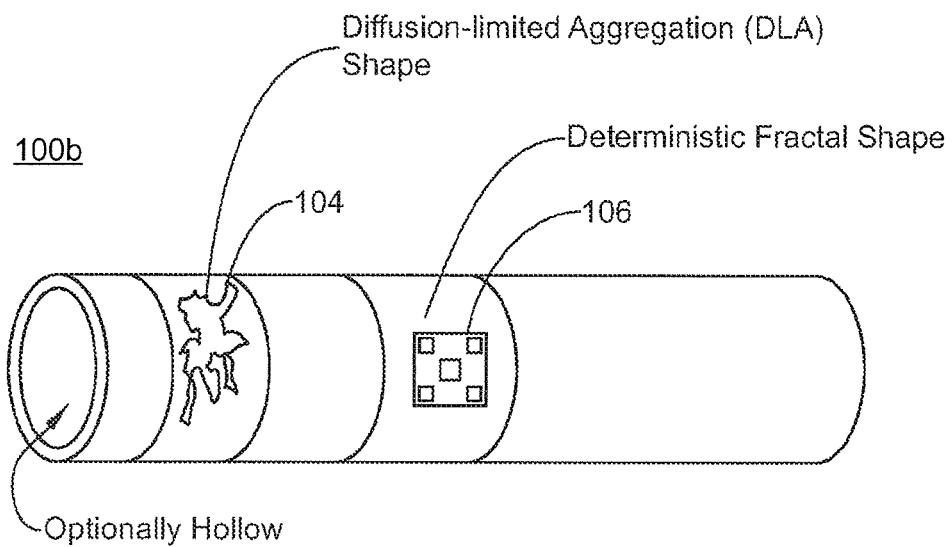

FIGS. 1A-1B illustrate perspective views of examples 100 of electrodes (e.g., cathodes) in accordance with the present disclosure. As shown in FIG. 1A, an electrode such as a cathode used for lattice assisted nuclear reactions and/or cold fusion processes may have an exposed surface having or presenting non-deterministic fractal features 102. Examples of such features can include but are not limited to ridges, grooves, pittings (pits, divots, craters, etc.), or other raised or lowered features/patterns (e.g., relative to the nominal shape of the electrode, e.g., a cylinder with circular cross-section. As shown, the electrode 100a may be solid. It 100a may be made of any suitable material, e.g., nickel, and may include or be covered (e.g., coated) with other suitable materials, such as metals or other materials suitable for deuterium-loading lattice assisted nuclear reactions and/or cold fusion processes. Suitable examples include but are not limited to nickel, including (e.g., as particulate inclusions or coatings) palladium, niobium, lithium containing ceramics, tantalum, vanadium, platinum, iridium, boron-10, and/or nickel-boron alloy.

With continued reference to FIG. 1A, a surface of the electrode (e.g., a cathode) may include fractal features/shapes/structures, which may be formed by any suitable methods and may be any suitable size, e.g., with features having characteristic dimensions (e.g., width) or the order of microns or 100's or 10's of nanometers for lattice assisted nuclear reactions and/or cold fusion processes. Suitable methods may include but are not limited to x-ray lithography, laser ablation using any suitable light in the ultraviolet (UV), visible or infrared (IR) selected based on the size of features desired (resolution of the laser), x-ray ablation, and/or electrochemical pitting. Furthermore such features may be coating with desired metals, metal alloys, or other materials, such as by sputtering or electroless immersion or suitable electroplating techniques, or the like.

FIG. 1B depicts further examples of fractal features/shapes/structures. Such fractal-based features can include so-called diffusion limited aggregation ("DLA") shapes or features 104 and/or deterministic fractal features 106, e.g., a Sierpinski carpet or gasket for a 2D shape or a Menger sponge for a 3D shape.

Electrodes (e.g., cathodes) with fractal features according to the present disclosure may have 3D features. Such 3D features may, for example, include but are not limited to crystal structures that have self-similar features that appear on different scales; in other words, they may be multiple-size crystals with quasi arbitrary or random arrangement; such 3D structures may include multiple-sized pitting or lacunar surfaces. Deterministic fractals may also be used or exhibited by the 3D features (these may be easier to implement with 3D printing or other fabrication or additive manufacturing techniques); examples include but are not limited to a Menger sponge or similar structures. Embodiments may have a fractal dimension from ranging from between 2.0 to 2.5, inclusive. Embodiments may have a fractal dimension from ranging from between 2.5 to 3.0, inclusive.

Diffusion-limited aggregation (DLA) is the process whereby particles undergoing a random walk due to Brownian motion cluster together to fmm aggregates of such particles. This theory, proposed by T. A. Witten Jr. and L. M. Sander in 1981, is applicable to aggregation in any system where diffusion is the primary means of transport in the system. DLA can be observed in many systems such as electrodeposition, Hele-Shaw flow, mineral deposits, and dielectric breakdown.

The clusters formed in DLA processes are referred to a s Brownian trees. These clusters are an example of a fractal. In 2-D these fractals exhibit a dimension of approximately 1.71 for free particles that are unrestricted by a lattice, however computer simulation of DLA on a lattice will change the fractal dimension slightly for a DLA in the same embedding dimension. Some variations are also observed depending on the geometry of the growth, whether it be from a single point radially outward or from a plane or line for example.

Computer simulation of DLA is one of the primary means of studying this model. Several methods are available to accomplish this. Simulations can be done on a lattice of any desired geometry of embedding dimension, or the simulation can be done more along the lines of a standard molecular dynamics simulation where a particle is allowed to freely random walk until it gets within a cellain critical range at which time it is pulled onto the cluster. In may be desirable for such to keep the number of particles undergoing Brownian motion in the system low so that only the diffusive nature of the system is present.

Figure 2A:
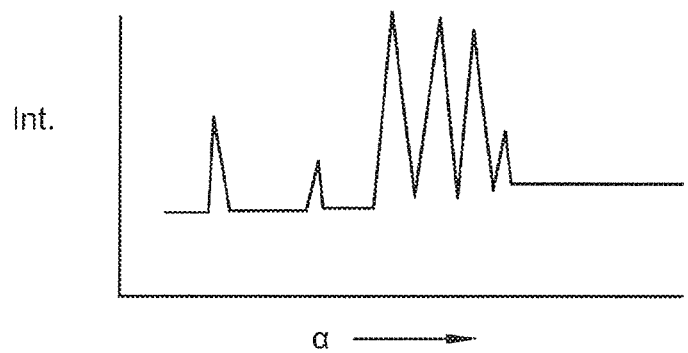
FIGS. 2A-2C illustrate examples of spectrographs useful for selecting certain frequencies or bands/ranges of frequencies of radio frequency (RF) energy for application to cathode structures for enhancement of lattice assisted nuclear reactions and/or cold fusion processes.
Figure 2B:
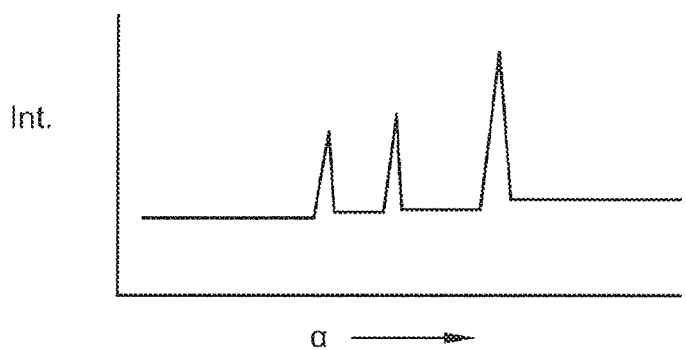
Figure 2C:
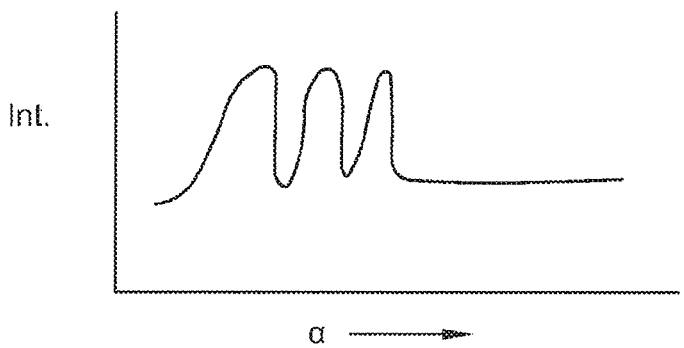
Figure 3A:
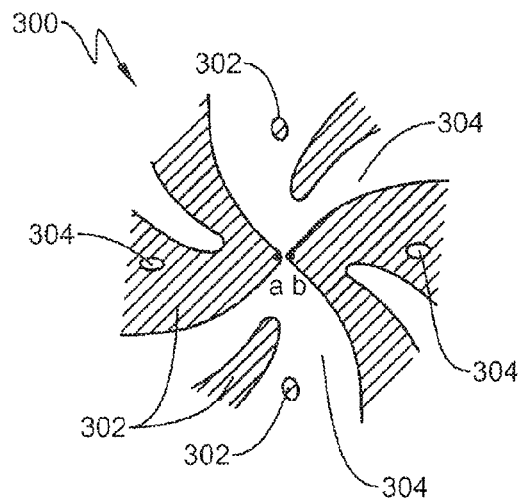
FIGS. 3A-3D depict examples of self-complementary shapes useful for embodiments of the present disclosure.
Figure 3B:
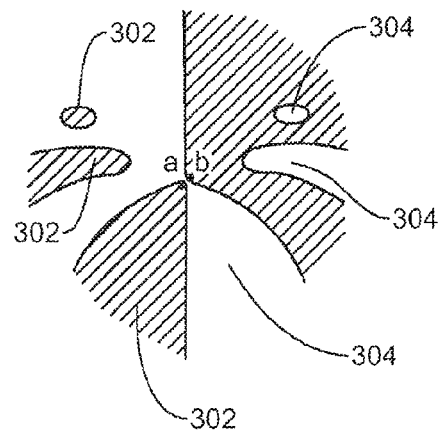
Figure 3C:
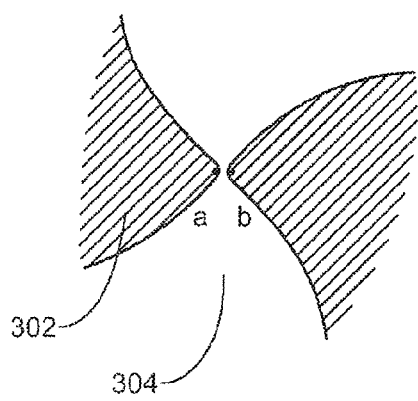
Figure 3D:
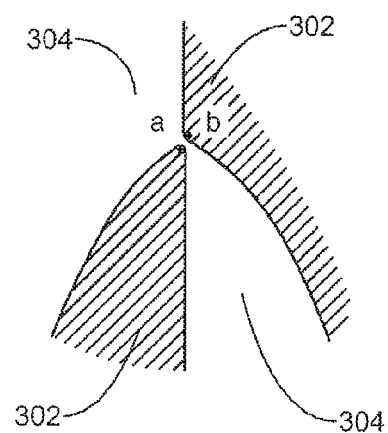

FIGS. 2A-2C illustrate examples of spectrographs useful for selecting (in a selection process 200) cellain frequencies or bands/ranges of frequencies of radio frequency (RF) energy for application to cathode structures for enhancement of lattice assisted nuclear reactions and/or cold fusion processes. The horizontal axis represents Energy of absorption peaks for different elements, while the vertical axis represents intensity. Each spectrograph shown depicts a different composition for an electrode, e.g., which can be a cathode used for lattice assisted nuclear reactions and/or cold fusion processes. Based on the materials present in such an electrode, which may be discerned from spectroscopic analysis, certain frequencies or bands/ranges of frequencies of radio frequency (RF) energy may be selected, e.g., by use of a look-up table, that are known or discerned to be useful (e.g., preferential over other RF frequencies) to enhance/drive/ facilitate one or more lattice assisted nuclear reactions and/or cold fusion processes. In this way, externally applied RF energy (power) can be used to enhance or facilitate one or more lattice assisted nuclear reactions and/or cold fusion processes. Such application of RF energy can be controlled and applied through RF techniques known to a person of ordinary skill in the art, e.g., by use of suitable RF transmitter operating at the selected frequency or frequencies or band(s); any suitable modulation techniques may be used for such application. In exemplary embodiments, such transmitted RF energy that is applied to an electrode structure is selected such that it absorbed by fractal features of the electrode structure. It may be useful for such energy (RF radiation) to have a wavelength or wavelengths that are scaled to match, substantially match, or resonate with the fractal features/structures of the electrode(s). For example, the wavelength of the applied RF energy may be matched to (or a scaled version of) one or more characteristic dimensions of the fractal structure, e.g., width or length of a dendritic arm or extension of a DLA structure shown in FIG. 1(b). For example, for a fractal structure having a feature 1 micron in width or length, a RF frequency of 300 THz (300000 GHz) may be desirable to use.

Examples of techniques and apparatus useful for nuclide transmutation as referenced herein are described in the following: U.S. Patent Application Publication No. US2012269309; U.S. Patent Application Publication No. 20130044847; the entire contents of all of which applications are incorporated herein by reference.

As was mentioned above, a further aspect of the present invention is directed to and can provide features (surfaces and/or three-dimensional shapes) that are self-complementary. Such features can be used for batteries and/or battery components in exemplary applications.

FIGS. 3A-3D depict examples 300 of self-complementary shapes useful for embodiments of the present disclosure. Features (e.g., surfaces and/or three-dimensional shapes) that are self-complementary can be included in various aspects of the subject technology (e.g., embodiments according to the present disclosure). These features can be used in and/or for the production of electricity, for example. Exemplary embodiments can include one or more electrodes (e.g., an anode and/or cathode) that include one or more self-complementary features. Such electrodes can be used in or for batteries that produce electricity from nuclear and/or chemical reactions.

As shown in FIGS. 3A-3D, shaded areas, e.g., 302, can indicate surfaces or solid features that are covered with or include conductive material(s). For example, such shaded area(s) 302 can include the surface of an electrode (e.g., anode and/or cathode) included within a battery or battery or electrochemical cell according to the present disclosure. Unshaded areas 304 can refer to or indicate open areas, e.g., voids or areas without conductive material(s).

Self-complementary features, e.g., as shown in FIGS. 3A-3D, or other such features, can provide for or facilitate desirable electrical characteristics such as constant or substantially constant impedance across the surface of the feature; such constant impedance can be for or at one or more frequencies, e.g., from a range of 5-100 Hz, including for example 60 Hz; other ranges may of course be used/ produced within the scope of the present disclosure. Thus, batteries that utilize such features can facilitate or provide increased or improved electrical performance.

Exemplary embodiments can include electrodes and/or battery components that have both fractal-based and self-complementary based features. For example, a battery according to the present disclosure may include an electrode that has fractal-based features and another electrode (and/or substrate) that includes self-complementary based features.

Accordingly embodiments/aspects of the present disclosure can offer various advantages, such as described previously. Without the invention(s) necessarily being limited by any described theory of operation, it is believed that the use of electrodes (e.g., cathodes) having pre-existing fractal features can mimic, enhance, or facilitate annealing of such cathodes when use for LANR or cold fusion processes; other benefits can include enhancing excess (or "anomalous") heat production, such as may be desirable for cold fusion processes uses to generate useful energy.

Unless otherwise indicated, the techniques for forming fractal shapes or structures that have been described herein can be implemented with, controlled by, or facilitated by use of a computer system configured to perform the functions that have been described. Each computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each such computer system may be a desktop computer or a portable computer, such as a laptop computer, a notebook computer, a tablet computer, a PDA, a smartphone, or part of a larger system, such a vehicle, appliance, and/or telephone system.

A single computer system may be shared. Each computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable/range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims is intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The following clauses pertain to exemplary embodiments.

1. An electrode including a surface having fractal-based features, wherein the features can be pre-existing features made prior to use for a LANR or cold fusion process.
2. The electrode of clause 1, wherein the fractal-based features are deterministic. 3. The electrode of clause 1, wherein the fractal-based features are non-deterministic. 4. The electrode of clause 1, wherein non-deterministic features comprised DLA features. 5. The electrode of clause 1 including nickel. 6. The electrode of clause 1 or 5 including (e.g., as particulate inclusions or coatings) palladium, niobium, lithium containing ceramics, tantalum, vanadium, platinum, iridium, boron-10, and/or nickel-boron alloy.
7. The electrode of clause 1 or 5 made by any suitable methods and that may be/is of any suitable size, e.g., with features having characteristic dimensions (e.g., width) or the order of microns or 100's or 10's of nanometers for lattice assisted nuclear reactions and/or cold fusion processes; wherein suitable methods may include but are not limited to x-ray lithography, laser ablation using any suitable light in the ultraviolet (UV), visible or infrared (IR) selected based on the size of features desired (resolution of the laser), x-ray ablation, and/or electrochemical pitting; wherein such features may be coating with desired metals, metal alloys, or other materials, such as by sputtering or electroless immersion or suitable electroplating techniques, or the like.
8. A method of using an electrode having pre-existing fractal-based structures to create transmutated products or to cause transmutation of compositions of matter, from a first state prior to a LANR or cold fusion process, to a second state different than the first, after a LANR or cold fusion process.
9. A method of making an electrode of clauses 1 through 6.
10. A method of applying RF energy to an electrode having fractal features (e.g., features having shapes based on, characterized by, characteristic of or including truncated series or iterations or orders or generations or iterations of a fractal or fractals).
11. The method of clause 10, wherein the electrode is according to any of clauses 1-7.
12. The method of clauses 10 or 11, wherein the frequency or frequencies of the RF energy is selected according to a look-up table (LUT), which may be in a non-transitory computer-readable storage medium.
13. The method of clause 12, wherein the frequency or frequencies (for selection) in the LUT correspond to a spectrograph for certain materials used for electrodes.
14. Any of clauses 1 through 13, wherein the electrode is a cathode.

What is claimed is:
1. A battery comprising:
a first electrode including a surface having a plurality of fractal features, wherein the plurality of fractal features include diffusion-limited aggregation (DLA) tree structure, wherein the DLA tree structure comprises a Brownian tree;
a second electrode, wherein the second electrode comprises a plurality of self-complementary features, wherein the plurality of self-complementary features include a conductive portion that includes a conductive material and a non-conductive portion that does not include a conductive material, and wherein the conductive portion and the non-conductive portion have shapes that are self-complementary to one another on an exposed surface of the second electrode; and an electrolyte, wherein in operation the electrolyte forms a first conductive path ionically connecting the first electrode to the second electrode, and a second conductive path, separate from the first conductive path, connecting the first electrode to the second electrode, wherein an electrical circuit is formed;

wherein the first electrode DLA tree structure forms an interface with the electrolyte.

2. The battery of claim 1, wherein the DLA tree structure is three-dimensional.

3. The battery of claim 1, wherein the second electrode comprises diffusion limited aggregation (DLA) tree structure.

4. The battery of claim 3, wherein the DLA tree structure is three-dimensional.

* * * * *